United States Patent [19]

Katayama et al.

[11] Patent Number: 4,802,383
[45] Date of Patent: Feb. 7, 1989

[54] POWER TRANSFER DEVICE FOR FOUR-WHEEL DRIVE

[75] Inventors: Nobuaki Katayama; Kan Sasaki; Takeharu Koide; Keisuke Takimura, all of Toyota, Japan

[73] Assignee: Toyota Jidosha Kabushiki Kaisha, Toyota, Japan

[21] Appl. No.: 53,061

[22] Filed: May 22, 1987

[30] Foreign Application Priority Data

May 23, 1986 [JP] Japan .................... 61-119650
Mar. 2, 1987 [JP] Japan ...................... 62-47260

[51] Int. Cl.⁴ ............................................. F16H 1/44
[52] U.S. Cl. ........................................ 74/711; 74/701; 180/249
[58] Field of Search ............... 74/711, 665 G B, 701, 74/710.5, 705, 695, 710; 180/248, 249, 250

[56] References Cited

U.S. PATENT DOCUMENTS

| 4,215,593 | 8/1980 | Shono et al. | 74/665 D |
| 4,237,745 | 12/1980 | Katayama et al. | 74/339 |
| 4,520,690 | 6/1985 | Dangel | 74/695 |
| 4,582,160 | 4/1986 | Weismann et al. | 74/705 X |
| 4,601,359 | 7/1986 | Weismann et al. | 180/248 X |
| 4,643,045 | 2/1987 | Katayama | 74/695 |
| 4,645,029 | 2/1987 | Sasaki et al. | 180/249 |
| 4,671,135 | 6/1987 | Dangel | 74/710.5 X |
| 4,671,136 | 6/1987 | Katayama | 74/710.5 |
| 4,697,470 | 10/1987 | Sasaki et al. | 180/249 X |

FOREIGN PATENT DOCUMENTS

| 985067 | 3/1976 | Canada | 74/711 |
| 0068309 | 1/1983 | European Pat. Off. | 74/711 |
| 0132238 | 1/1985 | European Pat. Off. | 180/249 |
| 60-236839 | 11/1985 | Japan . | |
| 60-236840 | 11/1985 | Japan . | |
| 60-236841 | 11/1985 | Japan . | |
| 2093416 | 9/1982 | United Kingdom . | |
| 8404792 | 12/1984 | World Int. Prop. O. . | |

Primary Examiner—Leslie A. Braun
Assistant Examiner—David Novais
Attorney, Agent, or Firm—Oblon, Fisher, Spivak, McClelland & Maier

[57] ABSTRACT

A power transfer device for four-wheel drive includes a center differential of the bevel gear type arranged to split the driving torque from a power transmission into two torque delivery paths respectively for front-wheel drive and rear-wheel drive, a front-drive differential of the bevel gear type arranged coaxially with the center differential at one side thereof to transfer the split driving torque from a side gear of the center differential to front-wheel axles, an output gear for rear-wheel drive arranged coaxially with the center differential at the other side thereof to transfer the split driving torque from another side gear of the center differential to rear-wheel axles, and a limited-slip differential in the form of a viscous coupling assembled with a mounting case for the output gear to effect limited-slip torque proportional to the difference in rotational speed between the side gears. In the transfer device, a clutch mechanism is arranged between the center differential and the mounting case for the output gear to selectively render the limited-slip differential inoperative.

6 Claims, 3 Drawing Sheets

POWER TRANSFER DEVICE FOR FOUR-WHEEL DRIVE

BACKGROUND OF THE INVENTION

1. Field of the Invention

The present invention relates to a power transfer device in combination with a power transmission for automotive vehicles, and more particularly to a power transfer device of the type which includes a limited-slip differential arranged to effect limited-slip torque proportional to the difference in rotational speed between the front and rear wheel axles of the vehicle.

2. Discussion of the Background

In Japanese Patent Early Publication No. 60-236839 issued on Nov. 25, 1985, there has been proposed a power transfer device which includes a center differential of the bevel gear type arranged to split the driving torque from a power transmission into two torque delivery paths respectively for front-wheel drive and rear-wheel drive, a front-drive differential of the bevel gear type arranged coaxially with the center differential at one side thereof to transfer the split driving torque from a first side gear of the center differential to front-wheel axles, and an output ring gear for rear-wheel drive arranged coaxially with the center differential at the other side thereof to transfer the split driving torque from a second side gear of the center differential to rear-wheel axles. In the power transfer device, a limited-slip differential in the form of a viscous coupling is assembled within a mounting case for the output ring gear to effect limited-slip torque proportional to the difference in rotational speed between the side gears. The limited-slip torque causes an increase of the driving torque at a low speed side and a decrease of the driving torque at a high speed side.

The limited-slip differential is, however, conditioned to be always driven in operation of the power transfer device. This means that when the power transfer device is operated in a condition where the vehicle is placed on a chassis dynamometer at its front or rear road wheels for measurement of emission gas, rate of fuel consumption, driving torque or the like and for check of meter indication, the limited-slip differential is driven for a long period of time under a large difference in rotational speed between the side gears of the center differential caused by rotation of the front or rear road wheels. This causes frictional heat in the limited-slip differential and results in rise of fluid temperature in the limited-slip differential. When the vehicle is towed in a condition where it is suspended from a tractor at its front or rear road wheels, the power transfer device is operated by rotation of the rear or front road wheels during travel of the tractor. In such a situation, the limited-slip differential is driven for a long period of time under a large difference in rotational speed between the side gears of the center differential. This causes the same problem described above. Furthermore, when the vehicle is towed in a condition where the front or rear wheel axles are suspended from a tractor, the power transfer device acts to rotate the front or rear road wheels during travel of the tractor.

SUMMARY OF THE INVENTION

It is, therefore, a primary object of the present invention to provide an improved power transfer device for four-wheel drive capable of overcoming the drawbacks described above.

According to the present invention, the object is attained by providing a power transfer device for four-wheel drive in combination with a power transmission, wherein the limited-slip differential includes first and second rotary elements coupled with each other for relative rotation, the first rotary element being assembled within the mounting case for relative rotation therewith and having a hollow shaft portion aligned with a first hollow shaft which is drivingly connected to the second side gear of the center differential, and the second rotary element being mounted on a second hollow shaft which is drivingly connected at an inner end thereof to the first side gear of the center differential and extends into the interior of the mounting case through the first hollow shaft, and wherein a clutch sleeve is arranged between the center differential and the output ring gear and axially slidably mounted on the first hollow shaft for rotation therewith and being shiftable between a first position where it is engaged with the mounting case and the hollow shaft portion of the first rotary element and a second position where it is disengaged from the mounting case and the hollow shaft portion of the first rotary element and engaged with a casing of the center differential.

It is preferable that the clutch sleeve is further shiftable to a third position where it is engaged with the mounting case and disengaged from the hollow shaft portion of the first rotary element. In a practical embodiment of the present invention, the first rotary element of the limited-slip differential is a drum-like outer casing assembled within the mounting case for relative rotation and having the hollow shaft portion connectable to the first hollow shaft, and the second rotary element of the limited-slip differential is an inner sleeve coupled with the outer casing for relative rotation and mounted on the second hollow shaft for rotation therewith. In a compartment between the outer casing and the inner sleeve, an amount of viscous fluid such as silicone oil is stored and a number of friction discs on the outer casing are interleaved with friction discs on the inner sleeve.

BRIEF DESCRIPTION OF THE DRAWINGS

Additional objects, features and advantages of the present invention will be readily appreciated from the following detailed description of a preferred embodiment thereof when considered with reference to the accompanying drawings, in which.

DESCRIPTION OF THE PREFERRED EMBODIMENT

Figure 1:
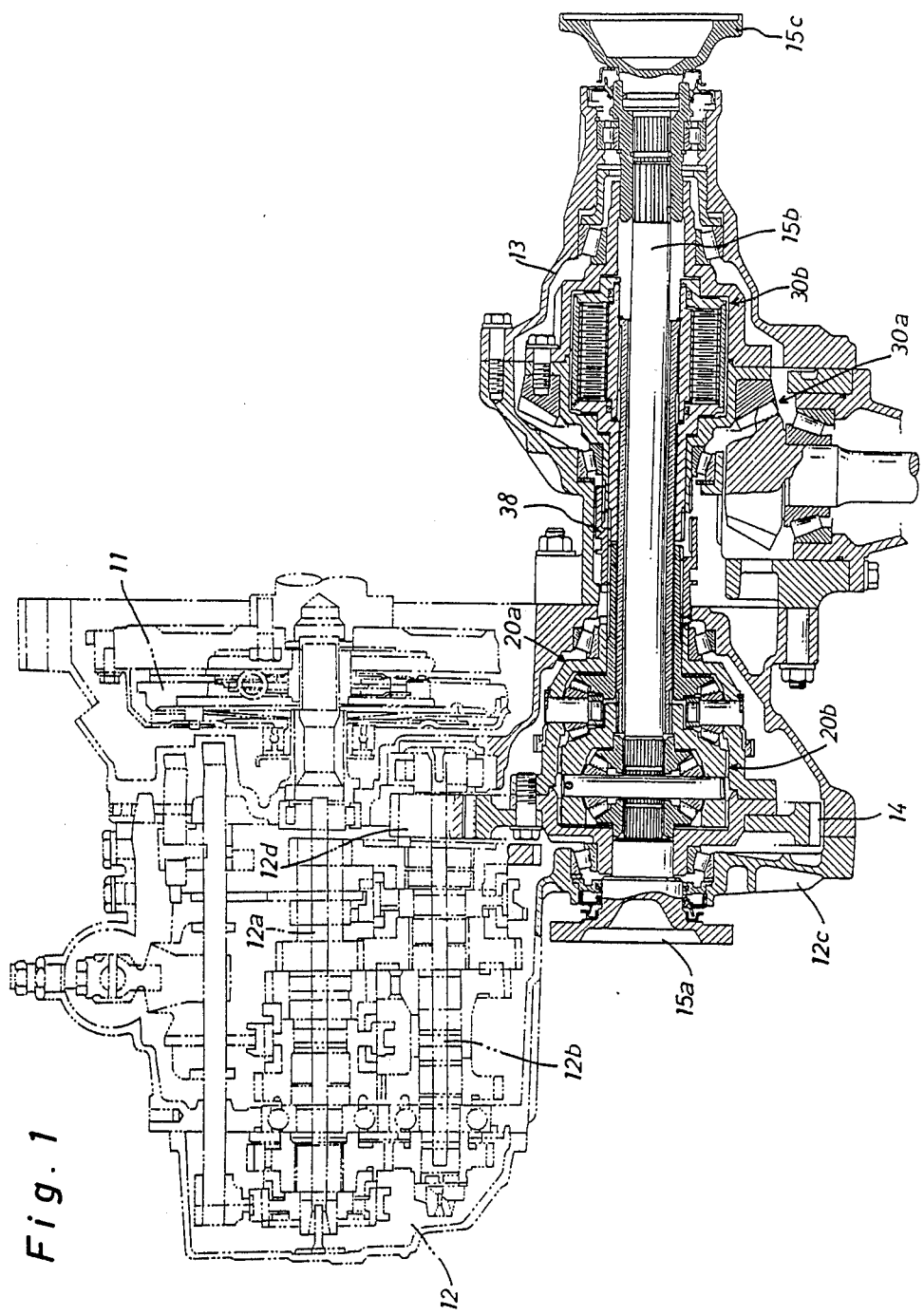
FIG. 1 is a sectional view of a power transfer device for four-wheel drive in combination with a power transmission.

Referring now to the drawings, FIG. 1 illustrates a power transfer device in accordance with the present invention which is adapted to a power transmission 12 for an automotive vehicle of the front-engine front-wheel drive type. The power transmission 12 is fixedly mounted to one side of an internal combustion engine (not shown) through a clutch mechanism 11 in a usual manner. The engine is mounted on the vehicle in such a manner that a crankshaft of the engine is transversely placed. The power transmission 12 includes a transmission casing 12c secured at one side thereof to a cylinder block of the engine, an input shaft 12a rotatably mounted within the transmission casing 12c and arranged coaxially with the crankshaft of the engine, an output shaft 12b rotatably mounted within the transmission casing 12c and arranged in parallel with the input shaft 12a, a change-speed gearing mounted on the input and output shafts 12a and 12b, and a final drive gearing including an output gear 12d mounted on the output shaft 12b for rotation therewith and arranged in mesh with an input ring gear 14 of the power transfer device.

Figure 2:
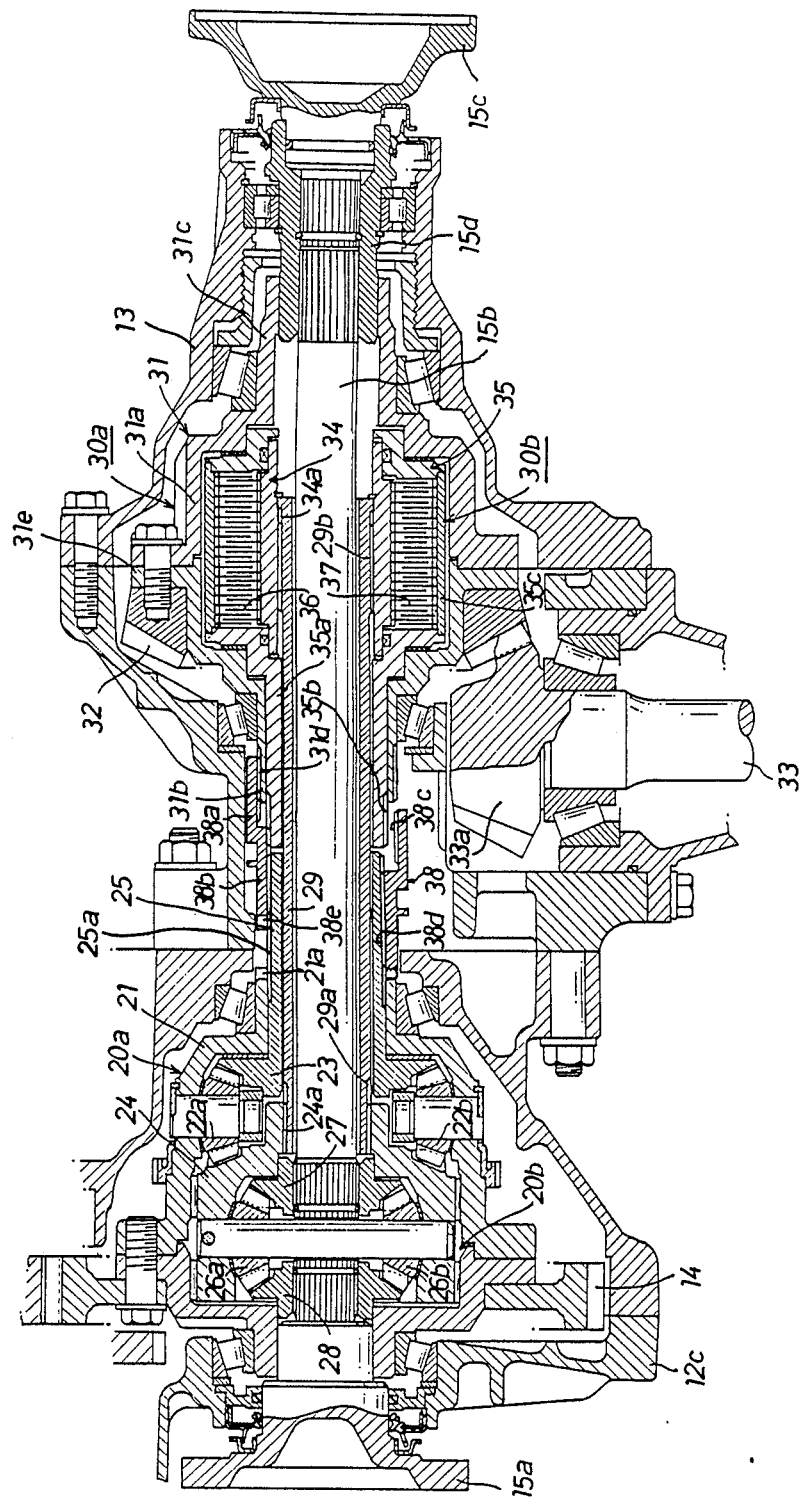
FIG. 2 is an enlarged sectional view illustrating in detail component parts of the power transfer device.

The power transfer device is contained within the transmission casing 12c and an additional housing 13 secured thereto, which device comprises a center differential 20a of the bevel gear type arranged to split the driving torque from the power transmission 12 into two torque delivery paths respectively for front-wheel drive and rear-wheel drive, a front-drive differential 20b of the bevel gear type arranged coaxially with the center differential 20a, an output gearing assembly 30a for rear-wheel drive, and a limited-slip differential 30b the form of a viscous coupling associated with the output gearing assembly 30a. As shown clearly in FIG. 2, the center differential 20a includes an input member in the form of a differential casing 21 located within the transmission casing 12c and rotatably supported by a pair of axially spaced bearings carried on the transmission casing 12c, a pair of pinion gears 22a, 22b rotatably carried on the differential casing 21 by means of respective cross shafts a pair of side gears 23, 24 rotatably mounted within the differential casing 21 and in mesh with the pinion gears 22a, 22b. The ring gear 14 is fixedly mounted on the differential casing 21 for rotation therewith. The right-hand side gear 23 is integrally formed with a first hollow shaft 25 which is rotatably supported by a sleeve portion of the differential casing 21 and extends from the transmission casing 12c into the interior of additional housing 13.

The front-drive differential 20b is rotatably mounted within the casing 21 of center differential 20a, which front-drive differential 20b includes an internal casing 45 integral with the left-hand side gear 24 of center differential 20a, a pair of pinion gears 26a, 26b rotatably carried on the internal casing 24 by means of a cross shaft, and a pair of side gears 27, 28 rotatably mounted within the internal casing 24 and in mesh with the pinion gears 26a, 26b. The internal casing 24 has a sleeve portion which extends into the central portion of differential 20a and is aligned with the side gear 23 and hollow shaft 25. The sleeve portion of the internal casing 24 is splined at 21a to a second hollow shaft 29 which extends through the first hollow shaft 25 into the interior of additional housing 13. The second hollow shaft 29 has an externally splined portion 29a in engagement with the internally splined portion 24a of the internal casing 24. The left-hand side gear 28 is rotatably carried on the differential casing 21 and splined to the inner end of a left-hand side shaft 15a which extends outwardly in a liquid-tight manner from the transmission casing 12c. The right-hand side gear 27 is rotatably carried on the internal casing 24 and splined to the inner end of a right-hand side shaft 15b which extends through the second hollow shaft 29 into the interior of additional housing 13. The left-hand side shaft 15a is integrally formed with a companion flange for drive connection to a left-hand front-wheel axle (not shown). A companion flange 15c for drive connection to a right-hand front-wheel axle is connected to the outer end of right-hand side shaft 15b by means of a holder 15d.

The output gearing assembly 30a for rear-wheel drive includes a mounting case 31, a ring gear 32 and a drive pinion shaft 33. The mounting case 31 is arranged coaxially with the center differential 20a and in surrounding relationship with the second hollow shaft 29 and the right-hand side shaft 15b. The mounting case 31 is provided with a cylindrical carrier portion 31a of increased diameter and with a pair of hollow shaft portions 31b and 31c which are rotatably supported by a pair of axially spaced bearings carried on the additional housing 13. The left-hand hollow shaft portion 31b of mounting case 31 is arranged to be connected to the first hollow shaft 25 by means of a stepped clutch sleeve 38 and has an external spline 31d engageable with the clutch sleeve 38. The ring gear 32 is fixedly mounted to an annular flange portion 31a of mounting case 31 and is permanently in mesh with a drive pinion 33a of shaft 33. The drive pinion shaft 33 is rotatably mounted within the additional housing 13 in a fore-and-aft direction of the vehicle and extends rearwardly in a liquid-tight manner from the additional housing 13. The drive pinion shaft 33 is drivingly connected in a usual manner to rear-wheel axles (not shown) by way of a propeller shaft (not shown) and a final drive gearing for rear-wheel drive (not shown).

The viscous coupling 30b is assembled within the cylindrical carrier portion 31a of mounting case 31 to cause limited-slip torque under viscous resistance of silicone oil stored therein. The viscous coupling 30b includes an inner sleeve 34, a drum-like outer casing 35 coupled with the inner sleeve 34 in a liquid-tight manner for relative rotation, and a number of friction discs 36 and 37 respectively assembled with the inner sleeve 34 and the outer casing 35 for rotation therewith. The inner sleeve 34 has an internally splined portion 34a in engagement with an externally splined portion 29b formed on the right end of hollow shaft 29. The outer casing 35 has a hollow shaft portion 35a which is formed with an externally splined portion 35b engageable with the clutch sleeve 38. The hollow shaft portion 35a of outer casing 35 is aligned with the first hollow shaft 25. Formed between the inner sleeve 34 and outer casing 35 is a compartment wherein a predetermined amount of silicone oil is stored. The friction discs 36 on innner sleeve 34 are interleaved with the friction discs 37 on outer casing 35 within the compartment.

In the power transfer device, the stepped clutch sleeve 38 has a large diameter portion 38a formed with an internal spline 38c engageable with the external spline 31d of hollow shaft portion 31b and a small diameter portion 38b formed with an internal spline 38d in engagement with the externally splined portion 25a of first hollow shaft 25 and engageable with the external spline 35b of hollow shaft portion 35as. The small diameter portion 38b of clutch sleeve 38 is further formed at its left end with mating teeth 38e engageable with mating teeth 21a formed on the right end of the sleeve portion of differential casing 21. The clutch sleeve 38 is connected to a shift mechanism S to be selectively shifted between first, second and third positions as shown in FIGS. 3 (aa)–(c).

Figure 3A:
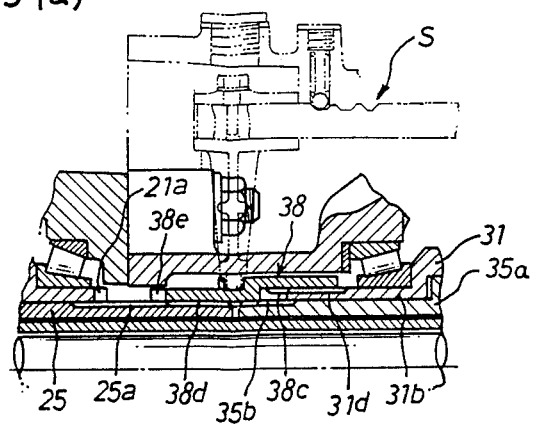
FIGS. 3(a), 3(b), and 3(c) illustrate respective engagment conditions of a clutch sleeve in the power transfer device shown in FIGS. 1 and 2.
Figure 3B:
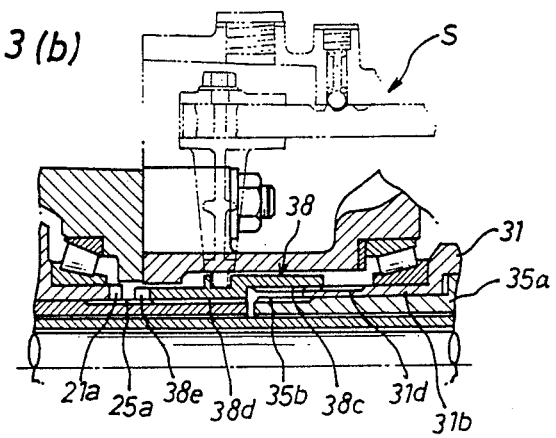
Figure 3C:
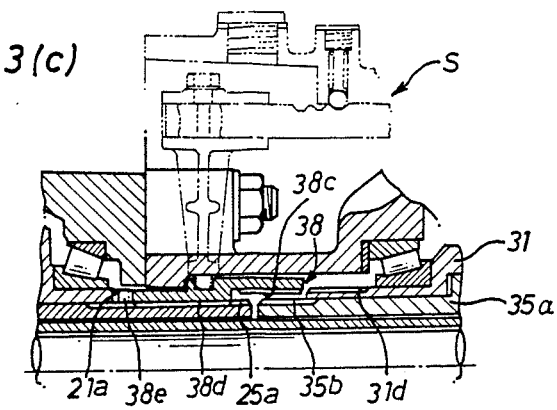

When shifted to and retained in the first position as shown in FIG. 3 (a), the clutch sleeve 38 is engaged at its internal spline 38c with the external spline 31d of hollow shaft portion 31b to connect the first hollow shaft 25 to the mounting case 31 and is engaged at its internal spline 38d with the external spline 35b of hollow shaft portion 35a to connect the first hollow shaft 25 to the outer casing 35 of viscous coupling 30b. When shifted to and retained in the second position as shown in FIG. 3 (b), the clutch sleeve 38 is maintained in engagement with the external spline 31d of hollow shaft portion 31b at its internal spline 38c to maintain drive connectior between the first hollow shaft 25 and mounting case 31 and is disengaged at its internal spline 38d from the external spline 35b of hollow shaft portion 35a to disconnect the first hollow shaft 25 from the outer casing 35 of viscous coupling 30b. When shifted to and retained in the third position as shown in FIG. 3 (c), the clutch sleeve 38 is engaged at its mating teeth 38e with the mating teeth 21a of differential casing 21 to connect the first hollow shaft 25 to the differential casing 21 and is disengaged from the external spline 31d of hollow shaft portion 31b to disconnect the first hollow shaft 25 from the mounting case 31.

In operation of the power transfer device, the driving torque of the engine is applied to the input shaft 12a of power transmission 12 through the associated clutch mechanism 11 and transmitted at a selected gear ratio to the output shaft 12b by way of the change-speed gearing. In turn, the driving torque from output shaft 12b is applied to the center differential 20a through the output gear 12d and ring gear 14. Thus, the center differential 20a operates to split the driving torque into two torque delivery paths toward the side gears 23 and 24. The split driving torque from side gear 24 is applied to the front-drive differential 20b and finally transmitted to the rear-wheel axles through the side gears 28 and 27 of differential 20b and the side shafts 15a and 15b. Assuming that the clutch sleeve 38 is retained in the first position to connect the first hollow shaft 25 to the mounting case 31 and outer casing 35 as shown in FIG. 3 (a), the split driving torque from side gear 23 is applied to the mounting case 31 through the first hollow shaft 25 and clutch sleeve 38 and transmitted to the pinion shaft 33 by way of the ring gear 32 to drive the rear-wheel axles by way of the propeller shaft and the final drive gearing for rear-wheel drive.

In such operation of the power transfer device, the difference in rotational speed between the side gears 23 and 24 causes relative rotation between the inner sleeve 34 and outer casing 35 in the viscous coupling 30b. This causes the viscous coupling 30b to effect limited-slip torque in accordance with the relative rotation between the inner sleeve 34 and outer casing 35. As a result, the driving torque of the front and rear-wheel axles increases at a low speed side and decreases at a high speed side. If either the front or rear road wheels skid in the mire or on a frozen road surface, the driving torque of the other road wheels will increase. This is effective to enhance roadability of the four-wheel drive vehicle.

From the above description, it will be understood that the viscous coupling 30b is interposed between the side gears 21 and 24 of center differential 20a to directly cause limited-slip torque proportional to the difference in rotational speed between the side gears 23 and 24. With such arrangement of viscous coupling 30b, all the limited-slip torque is applied to the front and rear-wheel axles. For this reason, the viscous coupling 30b can be assembled with the power transfer device in a compact size.

As described above, the power transfer device is characterized in that the clutch sleeve 38 is shiftable between the second and third positions as shown in FIGS. 3 (b) and (c). Assuming that the clutch sleeve is shifted to and retained in the second position to connect the first hollow shaft 25 only to the mounting case 31 as shown in FIG. 3 (b), the power transfer device is conditioned to effect four-wheel drive of the vehicle but the viscous coupling 30b is maintained inoperative. In a condition where the clutch sleeve 38 is shifted to and retained in the third position to disconnect the first hollow shaft 25 from the mounting case 31 and outer casing 53 and connect it to the differential casing 21 as shown in FIG. 3 (c), the center differential 20a is locked to disable relative rotation of the side gears 23 and 24, and the viscous coupling 30b is maintained inoperative. This is useful to avoid rise of viscous fluid temperature caused by frictional heat in the coupling 30b in a condition where the vehicle is placed on a chassis dynamometer at its front road wheels for measurement of emission gas, rate of fuel consumption, driving torque or the like and for check of meter indication or the vehicle is suspended from a tractor at its front road wheels. In the case that the vehicle is suspended from the tractor at its front-wheel axles, the power transfer device is conditioned to avoid rotation of the front road wheels caused by rotation of the rear road wheels during travel of the tractor.

Having now fully set forth the structure and operation of a preferred embodiment of the concept underlying the present invention, various other embodiments as well as certain variations and modifications of the embodiment herein shown and described will obviously occur to those skilled in the art upon becoming familiar with said underlying concept. For example, the viscous coupling 30b may be replaced with an appropriate coupling in which two rotary elements are arranged to cause limited-slip torque during relative rotation of them. It is to be understood, therefore, that within the scope of the appended claims, the invention may be practiced otherwise than as specifically set forth herein.

What is claimed is:

1. A power transfer device for four-wheel drive in combination with a power transmission, comprising:

a first differential of the bevel gear type arranged to split the driving torque from said power transmission into two torque delivery paths respectively for front-wheel drive and rear-wheel drive;

a second differential of the bevel gear type arranged coaxially with said first differential at one side thereof to transfer the split driving torque from a first side gear of said first differential to one of front and rear-wheel axles;

an output gear arranged coaxially with said first differential at the other side thereof to transfer the split driving torque from a second side gear of said first differential to the other of said rear and front-wheel axles; and a limited-slip differential assembled within a mounting case for said output gear to effect limited-slip torque proportional to the difference in rotational speed between said side gears;

wherein said limited-slip differential includes first and second rotary elements coupled with each other for relative rotation, said first rotary element being assembled within said mounting case for relative rotation and having a hollow shaft portion aligned with a first hollow shaft which is drivingly connected to the second side gear of said first differential, and said second rotary element being mounted on a second hollow shaft which is drivingly connected at an inner end thereof to the first side gear of said first differential and extends into the interior of said mounting case through said first hollow shaft, and a clutch sleeve arranged between said first differential and said output gear and axially slidably mounted on said first hollow shaft for rotation therewith and being shiftable between a first position where it is engaged with said mounting case and said hollow shaft portion of said first rotary element and a second position where it is disengaged from said mounting case and said hollow shaft portion of said first rotary element and engaged with a casing of said first differential, whereby said power transfer device may be switched between limited slip four wheel drive when said clutch sleeve is in said first position, and two wheel drive when said clutch sleeve is in said second position.

2. A power transfer device as recited in claim 1, wherein said clutch sleeve is further shiftable to a third position where it is engaged with said mounting case and disengaged from said hollow shaft portion of said first rotary element.

3. A power transfer device as recited in claim 1, wherein said mounting case has a hollow shaft portion in surrounding relationship with said hollow shaft portion of said first rotary element and engageable with said clutch sleeve.

4. A power transfer device as recited in claim 1, wherein said first rotary element of said limited-slip differential is a drum-like outer casing assembled within said mounting case for relative rotation and having said hollow shaft portion connectable to said first hollow shaft, and said second rotary element of said limited-slip differential is an inner sleeve coupled with said outer casing for relative rotation and mounted on said second hollow shaft for rotation therewith, and wherein an amount of viscous fluid is stored in a compartment between said outer casing and said inner sleeve, and a number of friction discs on said outer casing are interleaved with friction discs on said inner sleeve in the compartment.

5. A power transfer device as recited in claim 1, wherein said second differential includes an internal casing integral with the first side gear of said first differential and rotatable within the casing of said first differential, a pinion gear rotatably carried on said internal casing, and a pair of side gears rotatably mounted within said internal casing and in mesh with said pinion gear, and wherein one of said side gears of said second differential is drivingly connected to an inner end of a side shaft extending through said second hollow shaft.

6. A power transfer device as recited in claim 5, wherein said second differential is a front-drive differential arranged to transfer the split driving torque from the first side gear of said first differential to front-wheel axles, and said output gear is arranged to transfer the split driving torque from the second side gear of said first differential to rear-wheel axles.

* * * * *